(12) United States Patent
von Gutfeld et al.

(10) Patent No.: US 6,542,216 B2
(45) Date of Patent: Apr. 1, 2003

(54) SYSTEM AND METHOD FOR PRODUCING THIN FILM PATTERNS INTERSPERSED WITH VOIDS TO ADMIT LIGHT TO OTHERWISE SHADOWED REGIONS

(75) Inventors: Robert J. von Gutfeld, New York, NY (US); James H. Glownia, Somers, NY (US); James P. Doyle, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 09/757,164

(22) Filed: Jan. 9, 2001

(65) Prior Publication Data

US 2002/0089633 A1 Jul. 11, 2002

(51) Int. Cl.⁷ .................... G02F 1/1339; H01J 9/26; H01J 9/32
(52) U.S. Cl. .................... 349/153; 349/190; 445/24; 445/25
(58) Field of Search .................... 445/23, 24, 25; 349/143, 153, 190

(56) References Cited

U.S. PATENT DOCUMENTS

| | | | | |
|---|---|---|---|---|
| 5,263,888 A | * | 11/1993 | Ishihara et al. | |
| 6,111,357 A | * | 8/2000 | Fleming et al. | 445/24 X |
| 6,259,505 B1 | * | 7/2001 | Makino | 349/153 |
| 6,424,394 B1 | * | 7/2002 | Morii | 349/153 X |

* cited by examiner

*Primary Examiner*—Sandra Brase
(74) *Attorney, Agent, or Firm*—Casey P. August; Jon A. Gibbons; Fleit, Kain, Gibbons, Gutman & Bongini P.L.

(57) ABSTRACT

A metallized pattern, used as an electrical conductor, is altered by means of standard lithographic processes to have regions of interspersed missing metal, or voids, in a specified region of the pattern. The voids in the conducting pattern allow radiation, emanating from various angles, to penetrate through the voids so that a glue seal, disposed underneath the pattern, can be exposed to the radiation and thus activated and cured. The preferred application is found in flat panel displays where radiation is required to cure a glue seal that affixes two substrates to one another. The openings in the metallized pattern in the region of the glue seal minimize the shadowing, caused by the solid portions of the pattern, which can result in the lack of glue seal curing or polymerization. The absence of shadowing assures that the glue seal is fully cured and will not contaminate the liquid crystal after final processing.

20 Claims, 3 Drawing Sheets

SYSTEM AND METHOD FOR PRODUCING THIN FILM PATTERNS INTERSPERSED WITH VOIDS TO ADMIT LIGHT TO OTHERWISE SHADOWED REGIONS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of the Invention

The present invention generally relates to the field of flat panel displays. More particularly to the present invention relates to curing glue seals with radiation that may be partially disposed underneath data/signal lines.

2. Description of the Related Art

In the manufacturing of flat panel displays, it is necessary to bring data and signal lines from within the flat panel structure to a region outside the panel so that the lines can be connected to external driving circuitry. The flat panel typically consists of two substrates, one typically containing the circuitry and another typically containing a color filter, and a liquid crystal material placed in between these substrates. The substrates must be affixed to one another near the periphery of both substrates with a leak tight seal to contain the liquid crystal material. It is in this transition region, between the inside and outside of the panel, that some portions of glue seal used to affix the substrates to one another remain uncured or become only partially cured. In this region, the radiation used to cure the glue seal cannot penetrate the data/signal lines, thus the portions of the glue positioned between the data/signal lines and the second substrate remain uncured. Uncured glue can, overtime, lead to contamination of the liquid crystal material. Therefore, it is important to find ways to insure that the glue seal is thoroughly cured by overcoming the shadowing that prevents radiation from reaching glue seal underneath the data/signal lines.

Uncured glue seal in flat panels has not been a problem in the past because the manufacturing process involved heat sealing of the peripheral regions of the substrates forming the panel prior to their being filled with liquid crystal material. More recently, the 'one drop fill' method, also referred to as ODF, patented by Matsushita (U.S. Pat. No. 5,263,888), where the liquid crystal material is enclosed within between two substrates of the panel prior to curing or polymerizing of the glue seal around the panel periphery, has been used. Sealing of the panel using the ODF method generally requires radiation to be incident on the glue seal to cure or polymerize the glue since the temperature required for conventional oven baking to cure the glue seal would damage the liquid crystal material. The radiation used to cure the glue seal is generally directed onto the substrate whose lower side contains the data/signal lines, thus the lines, impermeable to the incident radiation, prevent the glue disposed underneath them from curing. The radiation cannot be directed from the opposite side of the panel, that is through the lower substrate (which would eliminate shadowing), because that substrate is purposely made opaque in the region of the glue seal and therefore cannot transmit the requisite radiation required for curing or polymerizing the glue seal.

SUMMARY OF THE INVENTION

The invention makes use of a thin film pattern disposed on a substrate. The pattern consists of a material that is electrically conducting such that there is electrical continuity between the ends of the pattern, typically a pattern constituting a data/signal line. Additionally, the pattern has a feature that at least one or more local regions of the pattern are interspersed with voids consisting of an absence of electrically conducting material. The conducting material, and the interspersed voids, may occupy an equal amount of surface area. For example, there may be circular or polygonal shaped voids within the conducting material, minimizing the amount of conducting material around the voids while leaving sufficient conducting material to maintain electrical continuity between the ends of the pattern. The size of the voids may vary but will always be less than any linear dimension of the pattern in order to maintain electrical continuity between its ends. While the voids dimension must obviously be greater than zero, in a preferred embodiment each void, and the spacing between voids, may be as small as one micron ($1\ \mu m$) for a pattern whose line width is on the order of 10~20 microns, and as large as five microns ($5\ \mu m$) for a pattern whose line width is on the order of 20~40 microns. The total area of the missing material or voids may be as much as 90% of the line area and still leave electrical continuity between the ends of the pattern.

In another embodiment, multiple depositions are made. A first layer is disposed that is very thin. The first layer is thin enough to be semi-transparent. Next, a second layer is formed on top of the first layer with a mask. The second layer is formed with a thickness appropriate to the resistance required for electrical continuity. Using this multiple deposition embodiment, the resulting semi-transparent regions form the voids in the thin film pattern.

There may be several voids within close proximity along the pattern's line width to present a honeycomb structure of voids amidst the electrically conducting material. This kind of structure has particular utility for data/signal lines found in flat panel displays in which the voids in the honeycomb structure are in contact with a glue seal that requires photolytic curing. The voids permit radiation, used for curing, to penetrate through the openings of the honeycomb structure so that most if not all of the glue will be cured by photolytic means without the major area of the lines shadowing the incident radiation used for curing.

In the preferred embodiment as applied to liquid crystal panels, a pattern, consisting of an electrically conducting material with voids, forms a portion of the data/signal lines. The presence of the voids in the pattern allows the radiation, used to cure the glue seal, to reach areas of the glue seal under the data/signal lines that would otherwise be shadowed without the present inventive structure.

Additionally, by varying the angle of incidence of the radiation source with respect to the pattern the irradiated area underneath the data/signal lines around the voids is increased. This method of irradiation, as compared with a fixed angle or perpendicular irradiation, exposes the glue seal in the periphery of the void beneath the pattern to radiation, thus further minimizing the uncured glue spots. Furthermore, for a dual cure glue seal, photolytic and thermally activated glue sealant, the irradiation method further utilizes a multiplicity of radiation frequencies and wavelengths, well known to those skilled in the art, that sets the glue to cure.

The data/signal lines distant from the glue seal region may consist of continuous conducting material, preferably metal, without any voids.

The data/signal lines in the region over the glue seal are patterned using special masks and lithographic techniques to provide the desired local voids. For example, the pattern with voids in the region of the glue seal can be produced using standard lithographic processes. The data/signal lines are fabricated by standard, well known lithographic processes. An additional photoresist step is then applied over the region of the data/signal lines coincident with the glue seal. A mask containing the desired arrangement of voids is positioned over the photoresist covering the data/signal lines. The photoresist is exposed, generally using near UV radiation, and then it is developed. The photolithographic pattern covering the data/signal lines is then exposed to a plasma or chemical etchant, well known to those skilled in the art, to remove the metal defined by the openings in the mask. Finally, the remaining photoresist is removed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The present invention solves the problem that arises when a thin film pattern, positioned between a radiation source and another material, prevents the radiation from reaching the material deposited beneath the pattern. The invention consists of providing for discrete absences of electrically conducting material, or voids, interspersed within the thin film pattern. These voids make possible for a radiation source to penetrate the pattern and affect a photolytic or thermally activated material disposed beneath it, thus minimizing the shadowed areas.

The pattern consists of an electrically conducting line that permits radiation to penetrate through an array of openings or voids within a select region of the line. While these openings, consisting of missing electrically conducting material are electrically insulating, they are spaced in a manner that nevertheless leaves the line electrically conducting between its ends. The openings allow radiation to photolytically cure a glue seal that lies underneath the conducting lines. Without these openings or voids the conducting lines would shadow radiation entering from a position above the conducting line thereby preventing photolytical curing or polymerization of the glue seal underneath the line. The curing method consists of varying the angle of incidence of the radiation source with respect to the surface of the pattern such that the radiation affects an area that otherwise will be shadowed by the pattern.

The present invention is particularly important in the area of flat panel displays where electrically conducting data/signal lines must be sealed near the panel periphery to avoid leakage of the liquid crystal while also avoiding contamination of the liquid crystal material with any potentially uncured glue seal.

Figure 1:
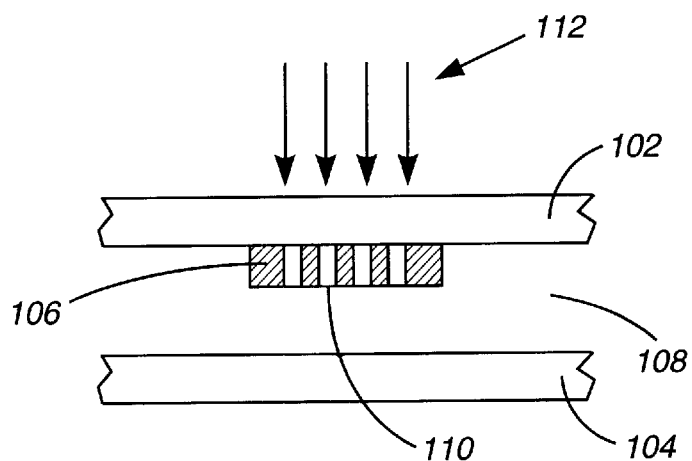
FIG. 1 shows in cross section a metallized line interposed between two substrates with a glue seal between the line and the lower substrate.

In FIG. 1 two substrates, substrate 102 and substrate 104 are shown in cross-section. On the lower surface of substrate 102, a thin film pattern of one or more electrically conducting lines 106 is disposed by any of a number of thin film deposition techniques. The lines 106 are generally opaque to incident radiation 112. Lines 106 have voids interspersed within specified regions that are coincident with glue seal 108. The areas 110 and glue seal 108 are typically near the outer periphery of substrate 102. The voids 110 consist of an absence of electrically conducting material, spaced in a manner that leaves lines 106 electrically conducting between the ends of the conducting pattern. At most, the absence of electrically conducting material should not exceed 90% of the surface area of the region of the metal line in which it is desired to have the voids. Glue seal 108 is used to affix substrate 102 to substrate 104 in contact with line 106. In the region where there is a void 110 the glue seal 108 can be directly accessed by radiation 112 incident on the top surface of radiation permeable substrate 102 in order to cure glue seal 108. The area of voids 110 within line 106 permit the glue seal 108 to cure by radiation 112 by reducing the effective area otherwise shadowed and left uncured by line 106.

The array of voids 110 can be arranged in a number of different ways. For example, the total area of voids 110 may be chosen to equal the area of the electrical conducting material in the region of voids so that only half of the line 106, in that same region constitutes electrically conducting material. The shape of the voids 110 may vary and can for example consist of closely spaced circular or polygonal shaped regions. Of course any void 110 must be smaller than any linear dimension of line 106 in particular the width of line 106, in order to maintain electrical continuity.

For typical conducting data/signal lines used in flat panel displays, the line width in the region of glue seal 108 is on the order of 15–50 microns. Thus circular voids approximately one to five microns in diameter, separated one to five microns from each other, would be practical.

Figure 2:
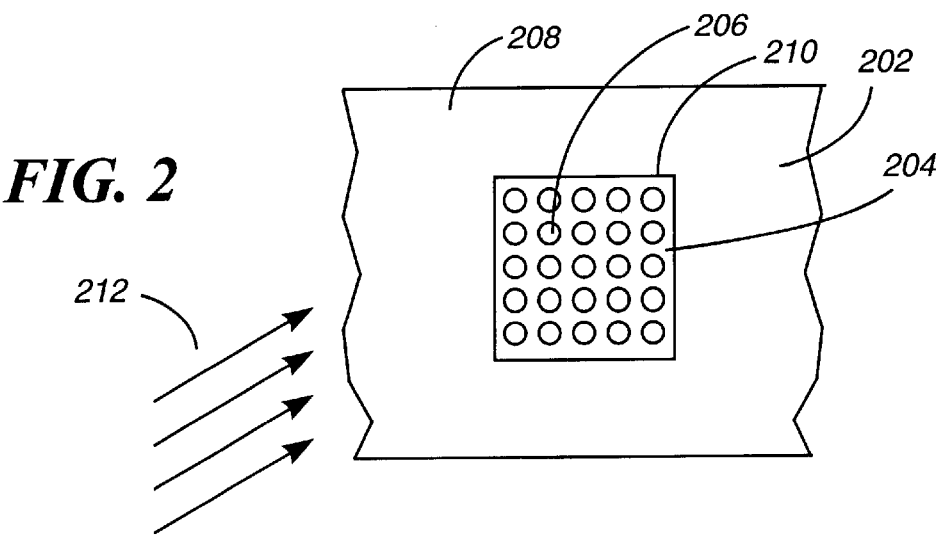
FIG. 2 shows a top view of an optically transparent substrate with a thin film pattern section containing closely spaced voids.

Turning to FIG. 2 shows a top view of an optically transparent substrate with a thin film pattern section containing closely spaced voids. The radiation can pass through the voids when irradiated from the top surface of the substrate with the thin film pattern disposed on the lower or opposite substrate surface.

Other electrically conducting patterns deposited on substrate 202 shown in FIG. 2 may consist of electrically conducting pads or rectangular sections 210 in contact with a glue seal 208. Here too, curing of the glue seal 208 located underneath pad 210 on substrate 202 may be effected by radiation using the present invention. The voids 206 leave pad 210 with openings that allow radiation 212 to reach most of the glue seal 208. Thus, any glue 208 that is not cured due to the opacity of conducting material of pad 210 will be trapped by the many surrounding regions of cured glue due to the openings or voids 206. In addition, the spacings between voids 206 and conducting material 210 allow for some migration of the photoinitiators, activated by radiation 212, to reach between the conducting portions of 210 and substrate 202. Therefore, even the glue seal 208 in the shadowed regions (i.e. the regions of conducting material 210) will likely become at least partially cured.

In one preferred embodiment, the circular shape of each void 206 may be approximately two microns in diameter. The circuitous conducting regions 210 together in combination with the multiplicity of voids 206 form a honeycomb structure 204.

Figure 3:
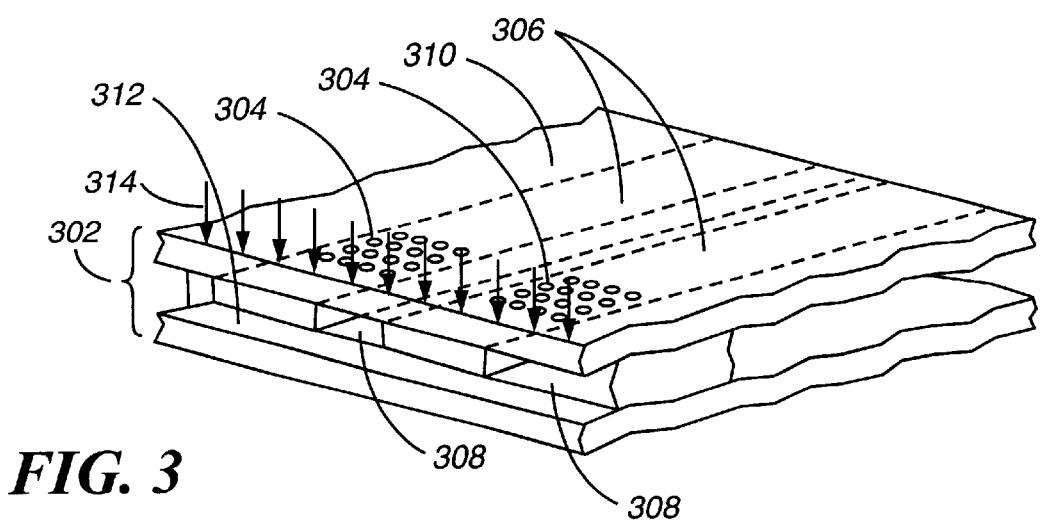
FIG. 3 shows a set of data/signal lines that are typically found in the fan out region of a flat panel display.

An example of an embodiment embracing the honeycomb structure 204 is shown in FIG. 3. Shown is FIG. 3 is a set of data/signal lines that are typically found in the fan out region of a flat panel display. The data/signal lines are deposited on the lower surface of the upper substrate and come in contact with the glue seal that is positioned between the upper and lower substrates. Voids interspersed in the data/signal lines permit radiation to cure a larger percentage of the glue seal by eliminating most of the shadowing created by the otherwise solid lines.

A section of the fan out region in a liquid crystal display panel 302 is shown where the conducting data/signal lines 306 intersect the glue seal 308. The lines with the honeycomb structure 304 are deposited on the bottom surface of substrate 310. Substrate 310 is affixed to substrate 312 with glue seal 308. The honeycomb structure 304 is limited to the glue seal region 308 where radiation 314 is used to cure the seal 308.

Figure 4:
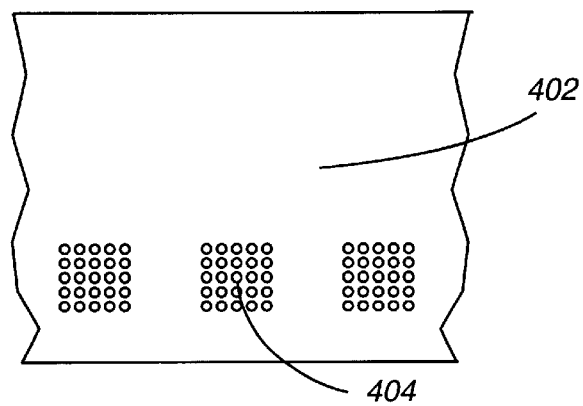
FIG. 4 shows a mask used to expose photoresist placed on the data/signal lines in the region of the glue seal.

To obtain the desired pattern for the data/signal lines with voids in the region of the glue seal, an opaque mask 402 is used with openings 404 as shown in FIG. 4. The openings 404 are transparent to the radiation that is used to expose the lithographic photoresist.

Figure 5:
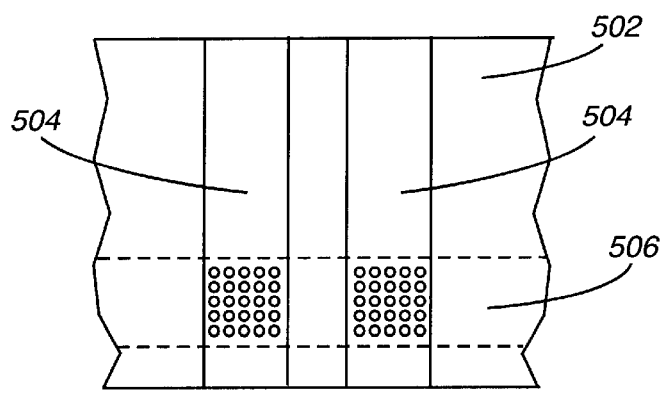
FIG. 5 shows the substrate containing data/signal lines over which the mask is placed to obtain the desired regions with voids in the lines.

FIG. 5 shows the general area 502 and the region 506 where the data/signal lines 504 obstruct the glue seal 506 from radiation. The data/signal lines 504 intersect the glue region 506 where the openings in lines 504 are to be lithographically positioned.

Figure 6:
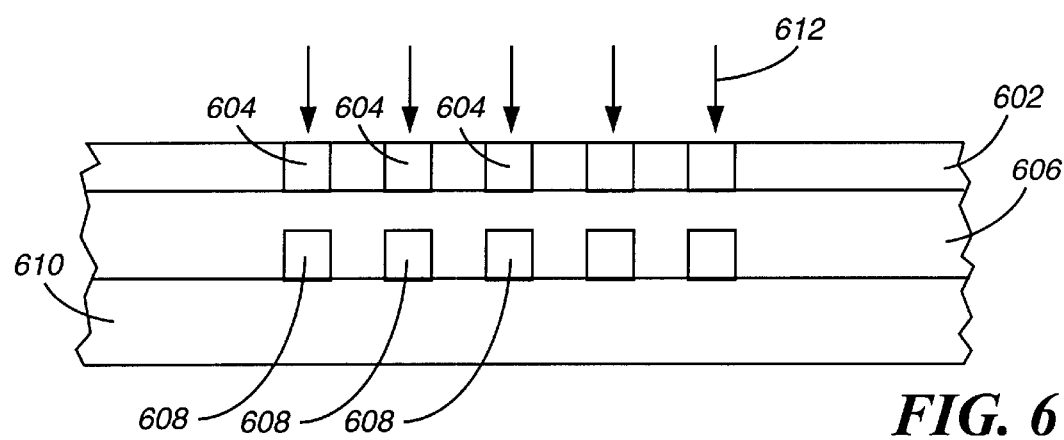
FIG. 6 shows the mask of FIG. 4 in place over the substrate covered with photoresist in order to obtain the desired pattern in the data/signal lines in the region of the glue seal.

FIG. 6 shows a cross sectional view of substrate 610 containing the data/signal lines 608. Mask 602, containing voids or optically transparent regions 604, is positioned onto substrate 610. Shown also is photoresist 606, disposed on to substrate 610, so that photoresist 606 can be exposed by radiation 612 to obtain the desired voids in lines 608 using standard photoresist lithography techniques.

Figure 7:
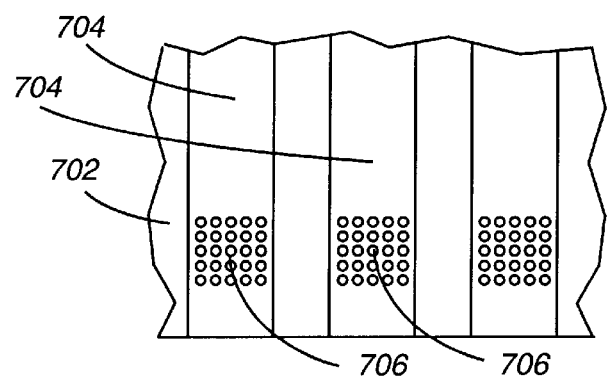
FIG. 7 shows the voids or missing regions of conducting material in the data/signal lines in the region where the glue needs to be exposed to radiation.

FIG. 7 shows the voids or missing regions of conducting material 706 in lines 704 on substrate 702. This pattern results after standard lithographic developing has taken place followed by etching of the metal prior to stripping of the resist, processing steps well known to those skilled in the art.

Figure 8:
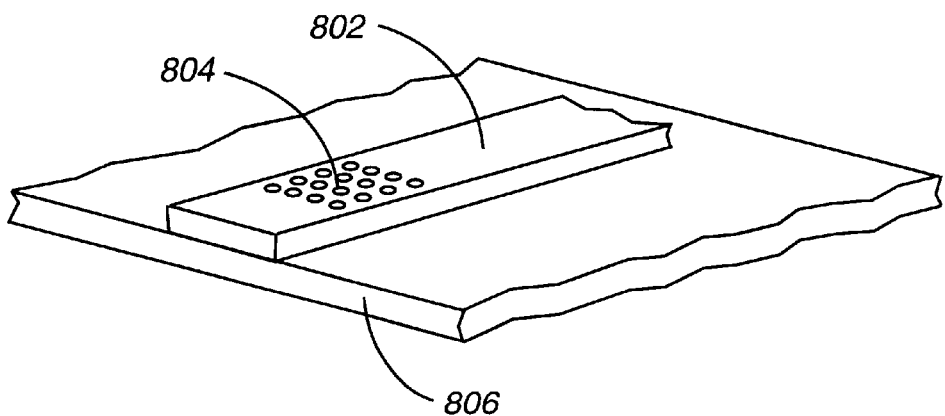
FIG. 8 shows a magnified view of a portion of a data/signal line containing the desired missing regions of metal in the corresponding region of the glue seal after lithographic processing.
Figure 9:
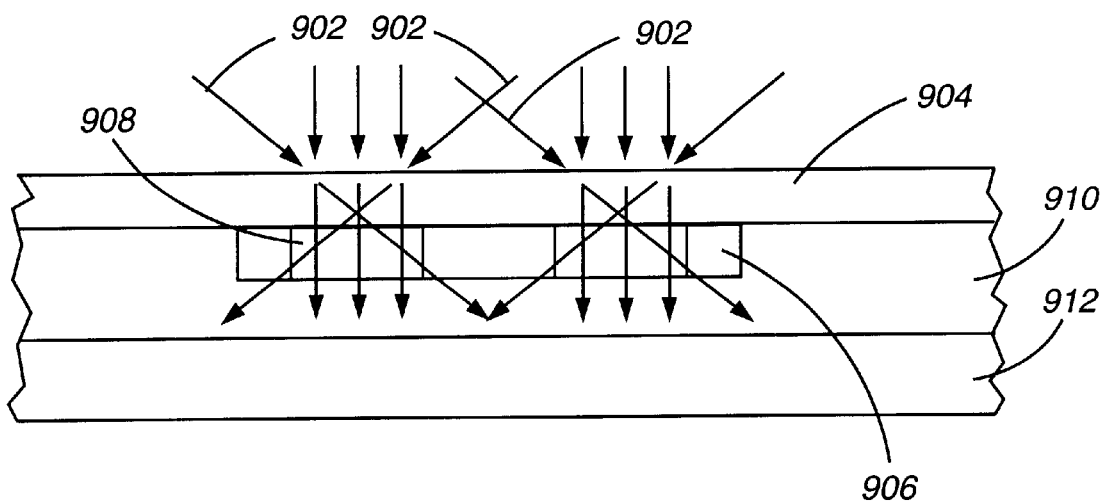
FIG. 9 shows a radiation source with a variable angle of incidence with respect to the thin film pattern that maximizes the area of the glue seal exposed to radiation.

FIG. 8 shows an enlargement of the metal line 802 on a portion of substrate 806. The voids 804 created by the lithographic steps only occupy a fraction of metal line 802, particularly in the region corresponding to the area where the glue seal will be disposed. FIG. 9 is a cross section view of a flat panel in the relevant region and shows radiation 902 at various angles of incidence above substrate 904, upon which thin film pattern 906 interspersed with voids 908 is disposed, affecting and curing the seal glue 910 used to join substrate 904 with substrate 912. By combining a thin film pattern 906 interspersed with voids 908 and a varying the angle of incidence of radiation 902, the area affected and cured by radiation 902 is substantially increased. If the glue seal 910 is a dual cure glue, photolytic and thermally activated glue sealant, the radiation 902 utilizes a multiplicity of frequencies and wavelengths, well known to those skilled in the art, that sets the glue 910 to cure i.e., a photolytic and thermally activated glue sealant.

It will be understood to those of average skill in the art, that the present invention provides metallization patterns that permit radiation to penetrate through a sufficient portion of the pattern to produce curing or polymerization of a glue seal in the area of, and particularly also underneath, the data/signal lines. This is accomplished by a series of voids in the pattern. The invention also includes means for producing the desired voids in the local regions of the data/signal lines (or in any metallization in the region of a glue seal) so that the opened areas allow radiation to reach a large fraction of the glue seal and insure proper polymerization or curing of the glue seal. The proper sealing is important to avoid contamination with the liquid crystal material as well as leakage of the liquid crystal through an uncured glue seal. The spacing of the voids is chosen such that the lines remain electrically conducting while leaving at most only minimal regions of glue underneath metallization that may remain uncured after irradiation.

It should be further understood that the present invention provides a method for curing the glue deposited between the pattern and the substrate. This method consists of varying the angle of incidence of the radiation source with respect to the pattern such that the radiation penetrates through the voids in the pattern and affects an area that otherwise would be shadowed by the pattern. In this manner, it is possible to maximize the area underneath the pattern that is irradiated, thus further minimizing the uncured glue spots. Any uncured glue beneath the data/signal lines will be surrounded by cured glue due to the direct radiation incident on the glue seal within the voids and is therefore unlikely to come in contact with the liquid crystal material in the interior of the panel.

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A thin film pattern disposed on at least one of two substrates, the pattern comprising:

a first end and a second end with electrical continuity between the first end and the second end of the pattern; and an electrically conducting material interspersed in at least one region of the pattern in which there is an absence of electrically conducting material, wherein a curable sealant is disposed on a periphery between the two substrates and a liquid crystal material is disposed between the two substrates and wherein the curable sealant is cured with radiation that is projected at varying angles of incidence with respect to the thin film pattern, so the curable sealant located in a penumbra of the thin film pattern is exposed and thereby aided in curing.

2. The thin film pattern of claim 1, wherein the pattern occupies a surface area on at least one of the two substrates and the electrically conducting material is at least 10% of the surface area.

3. The thin film pattern of claim 2, wherein the electrically conducting material in at least one region of the pattern is interspersed with a multiplicity of circular shaped absences of electrically conducting material.

4. The thin film pattern of claim 3, wherein the circular shaped absence of electrically conducting material has a diameter less than any linear dimension of the thin film pattern.

5. The thin film pattern of claim 4, wherein the circular shaped absence of electrically conducting material is more than 1 micron in diameter.

6. The thin film pattern of claim 1, wherein at least a portion of the pattern is honeycomb shape, the honeycomb shape comprising a plurality of areas with electrically conducting material interspersed and a plurality of areas in which there is an absence of electrically conducting material.

7. The thin film pattern of claim 1, wherein the electrically conducting material is interspersed in at least one region with a multiplicity of polygonal shaped absences of electrically conducting material.

8. The thin film pattern of claim 1, wherein the pattern comprises a portion of the data/signal lines of a liquid crystal display panel, and a portion of the pattern is in contact with a glue seal that requires curing by photolytic means.

9. The thin film pattern of claim 1, wherein the at least one region of the pattern in which there is an absence of electrically conducting material includes a pattern that has been removed by use of an etchant.

10. The thin film pattern of claim 1, wherein the absence of electrically conducting material of the pattern has been removed by use of plasma.

11. A display structure comprising:

a first substrate and a second substrate;

a curable sealant disposed on the periphery between the first substrate and the second substrate;

a liquid crystal material disposed in between the first and the second substrates; and an electrically conducting thin film pattern disposed on at least one of the first substrate or the second substrate interspersed in at least one region of the pattern in which there is a multiplicity of absences of electrically conducting material, wherein tho curable sealant is cured with radiation that is projected at varying angles of incidence with respect to the thin film pattern, so the curable sealant located in a penumbra of the thin film pattern is exposed thereby aided in curing.

12. The display structure of claim 11, wherein the curable sealant comprises at least one of a photolytically activated seal, a heat activated seal, or a photolytically and heat activated seal.

13. The display structure of claim 11, wherein the at least one region of the pattern in which there is a multiplicity of absences of electrically conducting material defines a surface area of the pattern that is not greater than 90% of the surface area of the pattern.

14. The display structure of claim 13, wherein in the at least one region of the pattern a shape of the multiplicity of absences of electrically conducting material is circular.

15. The display structure of claim of claim 14, wherein the circular shape has a diameter less than any linear dimension of the pattern.

16. The display structure of claim 15, wherein the pattern comprises at least one linear dimension and the circular shape has a diameter less than the at least one linear dimension of the pattern.

17. The display structure of claim 13, wherein at least a portion of the pattern is a honeycomb shape, the honeycomb shape comprising a plurality of areas with electrically conducting material interspersed with a plurality of areas in which there is an absence of electrically conducting material.

18. The display structure of claim 13, wherein the electrically conducting thin film pattern disposed on at least one of the first substrate or the second substrate interspersed in at least one region of the pattern in which there is an absence of electrically conducting material is in the shape of a polygon.

19. A method for curing a sealant disposed behind an electrically conducting thin film pattern interspersed with voids of electrically conducting material, the method comprising the steps of:

directing radiation towards a thin film pattern so the sealant is exposed to the radiation and is thereby aided in curing; and varying an angle of incidence of the radiation, with respect to the thin film pattern, so the sealant located in the penumbra of the thin film pattern is exposed and it is thereby aided in curing.

20. The method for curing a sealant of claim 19 wherein the step of directing radiation includes directing radiation with an intensity set to cause the thin film pattern to heat up to a predetermined temperature and thereby aid in curing the sealant.

* * * * *

UNITED STATES PATENT AND TRADEMARK OFFICE
CERTIFICATE OF CORRECTION

PATENT NO.    : 6,542,216 B2
DATED         : April 1, 2003
INVENTOR(S)   : Robert J. von Gutfeld et al.

It is certified that error appears in the above-identified patent and that said Letters Patent is hereby corrected as shown below:

<u>Column 8,</u>
Line 8, change "tho" to -- the --

Signed and Sealed this

Thirteenth Day of May, 2003

JAMES E. ROGAN
*Director of the United States Patent and Trademark Office*